US006896937B2

(12) United States Patent
Woudenberg (10) Patent No.: US 6,896,937 B2
(45) Date of Patent: May 24, 2005

(54) RADIATION-CURABLE INKS (75) Inventor: Richard C. Woudenberg, Keene, NH (US)

(73) Assignee: Markem Corporation, Keene, NH (US)

(*) Notice: Subject to any disclaimer, the term of this patent is extended or adjusted under 35 U.S.C. 154(b) by 0 days.

(21) Appl. No.: 10/714,325

(22) Filed: Nov. 14, 2003

(65) Prior Publication Data

US 2004/0132862 A1 Jul. 8, 2004

Related U.S. Application Data (60) Provisional application No. 60/426,995, filed on Nov. 15, 2002.

(51) Int. Cl.[7] .............................. C08J 7/04; B41J 2/01; C08F 2/50; C09J 11/10
(52) U.S. Cl. .............................. 427/511; 522/8; 522/9; 522/14; 522/18; 522/75; 522/83; 522/71; 522/10; 347/99; 347/100
(58) Field of Search .......................... 522/8, 9, 10, 75, 522/81, 182; 427/466, 511; 347/1, 99

(56) References Cited

U.S. PATENT DOCUMENTS

| | | | |
|---|---|---|---|
| 4,228,438 A | 10/1980 | Vazirani | |
| 4,303,924 A | 12/1981 | Young, Jr. | |
| 4,978,969 A | 12/1990 | Chieng | |
| 5,270,368 A | 12/1993 | Lent et al. | |
| 5,275,646 A | 1/1994 | Marshall et al. | |
| 5,380,769 A | 1/1995 | Titterington et al. | |
| 5,641,346 A | 6/1997 | Mantell et al. | |
| 5,770,325 A | 6/1998 | Keller et al. | |
| 5,889,084 A | 3/1999 | Roth | |
| 6,114,404 A | * 9/2000 | Deeken et al. | 522/88 |
| 6,114,406 A | * 9/2000 | Caiger et al. | 522/121 |
| 6,145,979 A | 11/2000 | Caiger et al. | |
| 6,164,850 A | 12/2000 | Speakman | |
| 6,296,986 B1 | 10/2001 | Illsley et al. | |
| 6,300,388 B1 | 10/2001 | Verdonck et al. | |
| 6,310,115 B1 | * 10/2001 | Vanmaele et al. | 522/25 |
| 6,326,419 B1 | 12/2001 | Smith | |
| 6,586,492 B1 | * 7/2003 | Caiger et al. | 522/75 |
| 2002/0004539 A1 | 1/2002 | Smith | |
| 2002/0068772 A1 | 6/2002 | Laksin et al. | |
| 2002/0198289 A1 | * 12/2002 | Gummeson | 523/400 |

FOREIGN PATENT DOCUMENTS

| | | |
|---|---|---|
| EP | 0 953 613 A2 | 11/1999 |
| EP | 0 997 507 A1 | 5/2000 |
| EP | 0 997 508 A1 | 5/2000 |
| EP | 1 091 247 A2 | 4/2001 |
| EP | 1 125 760 A1 | 8/2001 |
| EP | 0 993 378 B1 | 9/2001 |
| EP | 1 142 966 A1 | 10/2001 |
| GB | 2 330 331 | 4/1999 |
| GB | 2 330 451 | 4/1999 |
| JP | 2002-256189 | * 9/2002 |
| WO | 99/19900 | 4/1999 |
| WO | WO99/29787 | 6/1999 |
| WO | WO99/29788 | 6/1999 |
| WO | WO 99/54416 | * 10/1999 |
| WO | WO01/11426 | 2/2001 |

OTHER PUBLICATIONS

P. N. Green, "Photoinitiators, Types and Properties", vol. 175 No 4141, pp. 246–252, Apr. 17, 1985.*

(Continued)

Primary Examiner—Susan Berman
(74) Attorney, Agent, or Firm—Fish & Richardson P.C.

(57) ABSTRACT

Radiation-curable ink compositions and methods of printing including the compositions are disclosed. In some embodiments, a radiation-curable hot melt ink composition includes a colorant, a polymerizable monomer, and a photoinitiating system. The photoinitiating system can include 0.5–1.5% by weight of an aromatic ketone photoinitiator, 2–10% by weight of an amine synergist, 3–8% by weight of an alpha-cleavage type photoinitiator, and 0.5–1.5% by weight of a photosensitizer.

19 Claims, 3 Drawing Sheets $y = -2538.2\ln(x) + 3347$
$R^2 = 0.9904$

OTHER PUBLICATIONS

G.F. Vesley, "Mechanismss of the Photodecomposition of Initiators", Journal of Radiation Curing, pp. 4–10, Jan. 1986.*

S. P. Pappas, "Photoinitiated Polymerization", Comprehensive Polymer Science, vol. 4, pp. 338–344, Pergamon Press, 198.*

Sartomer, Application Bulletin "Ethoxylated TMPTA Monomers: Properties and Performance", Apr. 2002, Exton, PA.

Sartomer, Application Bulletin "Alkoxylated Cyclohexane Dimethanol Diacrylate for Improved Tensile Strength and Elongation", Apr. 2002, Exton, PA.

Sartomer, Application Bulletin "SR1137 Photoinitiator: The Liquid Advantage", Apr. 2002, Exton, PA.

Sartomer, Application Bulletin "Hydrophilic vs. Hydrophobic Monomers", Dec. 1997, Exton, PA.

Sartomer, Application Bulletin "Acrylated Amine Cointiators for UV Curable Coatings", Mar. 2000, Exton, PA.

Radcure: "Photoinitiators and Amine Synergists", UCB Chemicals—Industrial Coatings, no date.

* cited by examiner

RADIATION-CURABLE INKS

CLAIM OF PRIORITY

This application claims priority under 35 U.S.C. § 119(e) to U.S. Provisional Patent Application Ser. No. 60/426,995, filed on Nov. 15, 2002, the entire contents of which are hereby incorporated by reference.

BACKGROUND

The invention relates to radiation-curable inks including hot melt inks and liquid inks.

Hot melt inks are solid at room temperature and liquid at temperatures above room temperature. Hot melt inks can be used, for example, in digital to print methods. During printing, the ink is heated until it becomes liquid, and is then ejected through a printhead onto a substrate. The ink then solidifies on the substrate. Liquid inks are generally of low viscosity and can be used, for example, in ink jet printing.

UV curing or UV drying inks can have a low solvent content or be solvent free. Upon irradiation, the inks can cure relatively rapidly on a substrate, and the substrate can be promptly further processed.

SUMMARY

The invention relates to radiation-curable ink compositions, such as one that can be used in high speed printing (e.g., in high speed digital printing), methods for preparing the ink compositions, and methods for printing the ink compositions.

In one aspect, this invention features a radiation-curable hot melt ink composition, e.g., one composition in which one or more components can undergo a phase change. The composition can contain a colorant; a polymerizable monomer (e.g., a free radical polymerizable monomer); and a photoinitiating system comprising 0.5–1.5% by weight of an aromatic ketone photoinitiator, 2–10% by weight of an amine synergist, 3–8% by weight of an alpha-cleavage type photoinitiator, and 0.5–1.5% by weight of a photosensitizer. The composition can further contain a diluent, such as a mono-functional or di-functional monomer. Optionally, the composition contains a material such as a wax, a reactive wax, a resin, a reactive resin, or a combination of them. Each component in the photoinitiating system is preferably soluble in the polymerizable monomer and/or the diluent.

A hot melt composition can be a composition that is solid-like at room temperature (20° C. to 25° C.) and liquid at temperatures above room temperature (e.g., a jetting temperature, such as a temperature ranging from 30° C. to 150° C., e.g., from 40° C. to 100° C. or from 50° C. to 90° C.). As used herein, the composition can be a composition that is more viscous at room temperature than at temperatures above room temperature.

In some embodiments, the polymerizable monomer is a multi-functional (di-, tri-, or higher functional) monomer. The multi-functional monomer can be an acrylate monomer.

In other embodiments, the radiation-curable hot melt ink composition has a viscosity ranging from about 1 centipoise to about 50 centipoise (e.g., from about 5 centipoise to about 45 centipoise, or from about 7 centipoise to about 35 centipoise) at a temperature ranging from about 20° C. to about 150° C.

The invention also features a printing method. The method can include printing the radiation-curable hot melt ink composition on a substrate to form an image; and exposing the image to radiation (e.g., ultraviolet light radiation).

In another aspect, the invention features a radiation-curable liquid ink composition. The composition can contain a colorant; a liquid polymerizable monomer (e.g., a free radical polymerizable monomer); and a photoinitiating system comprising 2–4% by weight of an aromatic ketone photoinitiator, 5–10% by weight of an amine synergist, 5–10% by weight of an alpha-cleavage type photoinitiator, and 2–4% by weight of a photosensitizer. The composition can further contain a diluent, such as a mono-functional or di-functional monomer. Each component in the photoinitiating system can be soluble in the polymerizable monomer and/or the diluent.

In some embodiments, the polymerizable monomer is a multi-functional monomer. The multi-functional monomer can be an acrylate monomer.

In other embodiments, the radiation-curable liquid ink composition has a viscosity ranging from about 1 centipoise to about 50 centipoise at a temperature ranging from about 20° C. to about 150° C.

The invention further features a printing method. The method can include printing the radiation-curable liquid ink composition on a substrate to form an image; and curing the image by exposure to radiation (e.g., ultraviolet light radiation).

The details of one or more embodiments are set forth in the description below. Other aspects, features, and advantages will be apparent from the description and from the claims.

DETAILED DESCRIPTION

The invention relates to radiation-curable inks and methods for high speed printing of the inks. The radiation-curable inks can be inks which are cured, hardened, polymerized, or cross-linked by irradiation, such as ultraviolet light irradiation or the like from a radiant energy source. As discussed above, the inks include colorants, polymerizable monomers, and photoinitiating systems.

Colorants

Any colorant may be used to impart the desired color to the ink. The colorant includes at least one pigment, dye, or combination thereof. Preferred inks include less than about 10%, more preferably from about 0.1% to about 5%, by weight of the colorant. In some embodiments, the inks include less than or equal to about 10%, 9%, 8%, 7%, 6%, 5%, 4%, 3%, 2%, or 1% by weight of the colorant; and/or greater than or equal to about 0.1%, 1%, 2%, 3%, 4%, 5%, 6%, 7%, 8%, or 9% by weight of the colorant. Depending on applications, the inks may contain minimal colorant amounts to provide optical density. For example, the inks include less than 5% (e.g., less than 4%, less than 3%, less than 2%, or less than 1%) by weight of carbon black.

A wide variety of organic and inorganic pigments, alone or in combination, may be selected for use in the ink. A pigment may include a colorant that is soluble in a composition containing a solvent dye. The pigment particles are preferably sufficiently small to permit free flow of the ink through an ink jet printing device. The particle sizes are preferably selected to provide good dispersion stability.

The pigment can be black, cyan, magenta, yellow, red, blue, green, brown, or a mixture thereof. Examples of suitable pigments include pigment blacks 7, carbon black, graphite; and pigment white titanium dioxide. Additional examples are disclosed in, e.g., U.S. Pat. No. 5,389,133. The pigment may also have a modifying group on its surface, such as an oxygen-containing functionality (e.g., a carboxyl or phenol group).

The pigment may, but need not, be in the form of a dispersion containing a dispersant, which can assist in stabilizing the pigment, and also can prevent agglomeration of the pigment. The dispersant may be a polymeric dispersant. Suitable polymeric dispersants include, but are not limited to, AB or BAB block copolymers wherein the A block is hydrophobic and serves to link with the pigment, and the B block is hydrophilic and serves to disperse the pigment in a medium. Selection of the polymeric dispersant for a specific application can depend on the selected pigment. The dispersant also may be a polymer as described in, e.g., U.S. Pat. No. 5,205,861, or a mono- or di-functional monomer as described in the examples. In addition to or in place of a dispersant, a surfactant compound may be used. The surfactant compound may also serve to alter the surface tension of the ink, and may be an anionic, cationic, nonionic or amphoteric surfactant compound, such as those described in McCutcheon's Functional Materials, North American Edition, Manufacturing Confectioner Publishing Co., Glen Rock, N.J., pp. 110–129 (1990).

Alternatively or in addition to the pigment, the inks can contain a dye. Suitable dyes include, but are not limited to, Orasol Pink 5BLG, Black RLI, Blue 2GLN, Red G, Yellow 2GLN, Blue GN, Blue BLN, Black CN, and Brown CR (all available from Ciba-Geigy, Inc., Mississauga, Ontario); Morfast Blue 100, Red 101, Red 104, Yellow 102, Black 101, and Black 108 (all available from Morton Chemical Company, Ajax, Ontario); and a mixture thereof. Additional examples include those disclosed in, e.g., U.S. Pat. No. 5,389,133.

Mixtures of colorants may be employed, if necessary, including mixtures of pigments, mixtures of dyes, and mixtures of one or more pigments with one or more dyes.

Polymerizable Monomers

The inks can contain one or more polymerizable monomers, and optionally one or more diluents. The polymerizable monomers and the diluents can be mono-functional, di-functional, and tri- or higher functional material. The mono-, di-, tri-, and higher functional materials have, respectively, one, two, three, or more unsaturated carbon-carbon groups which are polymerizable by irradiating photoinitiators that are chemically activated when exposed to radiation, e.g., ultraviolet light radiation. Examples of the unsaturated carbon-carbon groups include vinyl and vinylidene groups. The polymerizable monomers can include di-functional, and tri- or higher functional materials, and the diluents include mono- and di-functional materials. Preferred inks include at least about 40%, more preferably from about 60% to about 90%, by weight of the polymerizable monomers and the diluents. In some embodiments, the inks include greater than or equal to about 40%, 45%, 50%, 55%, 60%, 65%, 70%, 75%, 80%, 85%, 90%, or 95% by weight of the polymerizable monomers and the diluents; and/or less than or equal to 95%, 90%, 85%, 80%, 75%, 70%, 65%, 60%, 55%, 50%, or 45% by weight of the polymerizable monomers and the diluents.

A mono-functional material can contain a single monomer or a mixture of monomers. The mono-functional material can be a straight or branched chain acrylate of an alcohol, or an acrylate of cyclic or polycyclic alkanols. Examples of the mono-functional materials include long chain aliphatic acrylates (e.g., lauryl acrylate or stearyl acrylate) and acrylates of alkoxylated alcohols (e.g., 2-(2-ethoxyethoxy)-ethyl acrylate. The mono-functional material need not necessarily be an acrylate. For example, methacrylate, vinyl, vinyl ether, or 1-propenyl ether may be used.

A di-functional material can contain a single monomer or a mixture of monomers. The di-functional material can be a diacrylate of a glycol or a polyglycol. Examples of the diacrylates include the diarylates of diethylene glycol, hexanediol, dipropylene glycol, tripropylene glycol, cyclohexane dimethanol (Sartomer CD406), and polyethylene glycols.

A tri- or higher functional material can contain a single monomer or a mixture of monomers. Examples of tri- or higher functional materials include tris(2-hydroxyethyl)-isocyanurate triacrylate (Sartomer SR386), dipentaerythritol pentaacrylate (Sartomer SR399), and alkoxylated acrylates (e.g., ethoxylated trimethylolpropane triacrylates (Sartomer SR454), propoxylated glyceryl triacrylate, and propoxylated pentaerythritol tetraacrylate).

Another example is a mixture of materials including epoxy acrylate, polyamide, monomers, and optionally acrylated polyamide, such as via Michael addition. Such a mixture is available as RM-370 from Cognis (Cincinnati, Ohio) and are described in U.S. Pat. Nos. 5,804,671, 5,889,076, 6,239,189, and 6,316,517, all hereby incorporated by reference in their entirety.

The inks may also contain one or more multi-functional oligomers or polymers. The oligomer or polymer can contain any suitable compound or mixture of compounds that contain one or more unsaturated carbon-carbon bonds, and may react with monomers upon radiation curing. Examples of the oligomers or polymers include polyacrylates such as urethane acrylates and epoxy acrylates.

The combination of the polymerizable monomers and the diluents results in a desired viscosity of the ink composition. The viscosity value can be in the range of about 1 centipoise to about 50 centipoise (e.g., from about 5 centipoise to about 45 centipoise, or from about 7 centipoise to about 35 centipoise) at a temperature ranging from about 20° C. to about 150° C. In some embodiments, the viscosity value can range from greater than or equal to 1, 5, 10, 15, 20, 25, 30, 35, 40, or 45 centipoise; and/or less than or equal to about 50, 45, 40, 35, 30, 25, 20, 15, 10, or 5 centipoise. For inks which require lower viscosity, one or more low molecular weight mono- or multi-functional monomers may be included. For inks which require higher viscosity, one or more multi-functional oligomers, polymers, or reactive polymers may be included.

Photoinitiating Systems

A photoinitiating system, e.g., a blend, in the inks is capable of initiating polymerization reactions upon irradiation (e.g., ultraviolet light irradiation), e.g., a blend capable of producing free radicals. The photoinitiating system may initiate a ring opening polymerization reaction, a free radical polymerization reaction, a cationic reaction, or a combination of these reactions, e.g., a combination of ring opening and free radical polymerization.

The photoinitiating system can include the following components: an aromatic ketone photoinitiator, an amine synergist, an alpha-cleavage type photoinitiator, and/or a photosensitizer. Each component is fully soluble in the monomers and/or diluents described above.

An aromatic ketone photoinitiator can be an aromatic ketone that undergoes homolysis by two processes (often simultaneously): fragmentation and hydrogen abstraction, in which the hydrogen abstraction occurs in the presence of a hydrogen donor. In general, the aromatic ketone has a benzophenone skeleton. Examples of the aromatic ketones include, but are not limited to, 4-phenylbenzophenone, dimethyl benzophenone, trimethyl benzophenone (Esacure TZT), and methyl O-benzoyl benzoate.

An amine synergist can be an amine, as well as a hydrogen donor with abstractable hydrogens. For example, the amine synergist is a tertiary amine. Examples of the amine synergists include, but are not limited to, 2-(dimethylamino)-ethyl benzoate, ethyl 4-(dimehtylamino) benzoate, and amine functional acrylate synergists (e.g., Sartomer CN384, CN373).

An alpha-cleavage type photoinitiator can be an aliphatic or aromatic ketone that undergoes homolysis at the alpha position of the carbonyl group by one process: fragmentation. Examples of the alpha-cleavage type photoinitiators include, but are not limited to, 2,2-dimethoxy-2-phenyl acetophenone, 2,4,6-trimethylbenzoyl-diphenylphosphine oxide, and 2-methyl-1-[4-(methylthio)phenyl-2-morpholino propan-1-one (Irgacure 907).

A photosensitizer can be a substance that either increases the rate of a photoinitiated polymerization reaction or shifts the wavelength at which the polymerization reaction occurs. The photosensitizer can extend the range of an alpha-cleavage type photoinitiator by absorbing radiation into the visible wavelength, and transferring the energy to the alpha-cleavage type photoinitiator. Examples of photosensitizers include, but are not limited to, isopropylthioxanthone (ITX), diethylthioxanthone, and 2-chlorothioxanthone.

As an example, a hot melt ink composition may include 0.5–1.5% by weight of the aromatic ketone photoinitiator, 2–10% by weight of the amine synergist, 3–8% by weight of the alpha-cleavage type photoinitiator, and 0.5–1.5% by weight of the photosensitizer. A liquid composition may include 2–4% by weight of the aromatic ketone photoinitiator, 5–10% by weight of the amine synergist, 5–10% by weight of the alpha-cleavage type photoinitiator, and 2–4% by weight of the photosensitizer.

In some embodiments, the hot melt ink composition includes greater than or equal to about 0.5%, 0.6%, 0.7%, 0.8%, 0.9%, 1.0%, 1.1%, 1.2%, 1.3%, or 1.4% by weight of the aromatic ketone photoinitiator; and/or less than or equal to about 1.5%, 1.4%, 1.3%, 1.2%, 1.1%, 1.0%, 0.9%, 0.8%, 0.7%, or 0.6% by weight of the aromatic ketone photoinitiator. The hot melt ink composition can include greater than or equal to about 2%, 3%, 4%, 5%, 6%, 7%, 8%, or 9% by weight of the amine synergist; and/or less than or equal to about 10%, 9%, 8%, 7%, 6%, 5%, 4%, or 3% by weight of the amine synergist. The hot melt ink composition can include greater than or equal to about 3%, 4%, 5%, 6%, or 7% by weight of the alpha-cleavage type photoinitiator; and/or less than or equal to about 8%, 7%, 6%, 5%, 4%, or 3% by weight of the alpha-cleavage type photoinitiator. The hot melt ink composition can include greater than or equal to about 0.5%, 0.6%, 0.7%, 0.8%, 0.9%, 1.0%, 1.1%, 1.2%, 1.3%, or 1.4% by weight of the photosensitizer; and/or less than or equal to about 1.5%, 1.4%, 1.3%, 1.2%, 1.1%, 1.0%, 0.9%, 0.8%, 0.7%, or 0.6% by weight of the photosensitizer.

In some embodiments, the liquid ink composition includes greater than or equal to about 2%, 2.5%, 3%, or 3.5% by weight of the aromatic ketone photoinitiator; and/or less than or equal to about 4%, 3.5%, 3%, 2.5% by weight of the aromatic ketone photoinitiator. The liquid ink composition can include greater than or equal to about 5%, 6%, 7%, 8%, or 9% by weight of the amine synergist; and/or less than or equal to about 10%, 9%, 8%, 7%, or 6% by weight of the amine synergist. The liquid ink composition can include greater than or equal to about 5%, 6%, 7%, 8%, or 9% by weight of the alpha-cleavage type photoinitiator; and/or less than or equal to about 10%, 9%, 8%, 7%, or 6% by weight of the alpha-cleavage type photoinitiator. The hot melt ink composition can include greater than or equal to about 2%, 2.5%, 3%, or 3.5% by weight of the photosensitizer; and/or less than or equal to about 4%, 3.5%, 3%, or 2.5% by weight of the photosensitizer.

Adjuvants

The inks may contain an adjuvant such as a vehicle (e.g., a wax or resin), a stabilizer, an oil, a flexibilizer, or a plasticizer. The stabilizer can inhibit oxidation of the ink. The oil, flexibilizer, and plasticizer can reduce the viscosity of the ink.

Examples of waxes include, but are not limited to, stearic acid; succinic acid; beeswax; candelilla wax; carnauba wax; alkylene oxide adducts of alkyl alcohols; phosphate esters of alkyl alcohols; alpha alkyl omega hydroxy poly (oxyethylene); allyl nonanoate; allyl octanoate; allyl sorbate; allyl tiglate; rice bran wax; paraffin wax; microcrystalline wax; synthetic paraffin wax; synthetic paraffin and succinic derivatives; petroleum wax; synthetic petroleum wax; cocoa butter; diacetyl tartaric acid esters of mono and diglycerides; mono and diglycerides; alpha butyl omega hydroxypoly(oxyethylene)poly(oxypropylene); calcium pantothenate; fatty acids; organic esters of fatty acids; amides of fatty acids (e.g., stearamide, stearyl stearamide, erucyl stearamide (e.g., Kemamide S-221 from Crompton-Knowles/Witco)); calcium salts of fatty acids; mono & diesters of fatty acids; sucrose fatty acid esters; calcium stearoly-2-lactylate; Japan wax; lanolin; glyceryl hydroxydecanoate; glyceryl hydroxydodecanoate; oxidatively refined montan wax fatty acids,; polyhydric alcohol diesters; oleic acids; palmitic acid; d-pantothenamide; polyethylene glycol (400) dioleate; polyethylene glycol (MW 200–9,500); polyethylene (MW 200–21,000); oxidized polyethylene; polyglycerol esters of fatty acids; polyglyceryl phthalate ester of coconut oil fatty acids; shellac wax; hydroxylated soybean oil fatty acids; stearyl alcohol; and tallow and its derivatives.

Examples of resins include, but are not limited to, acacia (gum arabic); gum ghatti; guar gum; locust (carob) bean gum; karaya gum (sterculia gum); gum tragacanth; chicle; highly stabilized rosin ester; tall oil; manila copais; corn gluten; coumarone-indene resins; crown gum; damar gum; p, alpha-dimethylstyrene; gum elemi; ethylene oxide polymer and its adducts; ethylene oxide/propylene oxide copolymer and its adducts; galbanum resin; gellan gum; ghatti gum; gluten gum; gualac gum; guarana gum; heptyl paraben; cellulose resins, including methyl and hydroxypropyl; hydroxypropyl methylcellulose resins; isobutylene-isoprene copolymer; mastic gum; oat gum; opopanax gum; polyacrylamide; modified polyacrylamide resin; polylimonene; polyisobutylene (min. MW 37,000); polymaleic acid; polyoxyethylene derivatives; polypropylene glycol (MW 1200–3000); polyvinyl acetate; polyvinyl alcohol; polyvinyl polypyrrolidone; polyvinyl pyrrolidone; rosin, adduct with fumaric acid, pentaerythritol ester; rosin, gum, glycerol ester; rosin, gum or wood, pentaerythritol ester; rosin, gum or wood, partially hydrogenated, glycerol ester; rosin, gum or wood, partially hydrogenated, pentaerythritol ester; rosin, methyl ester, partially hydrogenated; rosin, partially dimerized, glycerol ester; rosin, partially hydrogenated; rosin and rosin derivatives; rosin, polymerized, glycerol ester; rosin, tall oil, glycerol ester; rosin, wood; rosin, wood, glycerol ester; purified shellac; styrene; styrene terpolymers; styrene copolymers; sucrose acetate isobutyrate; terpene resins, natural and synthetic; turpentine gum; vinylacetate; vinyl chloride-vinylidene chloride copolymer; zanthan gum; and zein.

Examples of stabilizers, oils, flexibilizers and plasticizers include, but are not limited to, methylether hydroquinone (MEHQ); hydroquinone (HQ); Genorad 16 (a free radical stabilizer from Rahn Corp.); butylated hydroxyanisole (BHA); butylated hydoxytoluene (BHT); propyl gallate; tert-butyl hydroquinone (TBHQ); ethylenediaminetetraacetic acid (EDTA); methyl paraben; propyl paraben; benzoic acid; glycerin; lecithin and modified lecithins; agar-agar; dextrin; diacetyl; enzyme modified fats; glucono delta-lactone; carrot oil; chincona extract; rapeseed oil; pectins; propylene glycol; peanut oil; sorbitol; acetophenone; brominated vegetable oil; polyoxyethylene 60 sorbitan mono stearate; olestra; castor oil; oiticia oil; 1,3 butylene glycol; coconut oil and its derivatives; corn oil; substituted benzoates; substituted butyrates; substituted citrates; substituted formates; substituted hexanoates; substituted isovalerates; substituted lactates; substituted propionates; substituted isobutyrates; substituted octanoates; substituted palmitates; substituted myristates; substituted oleates; substituted stearates, distearates and tristearates; substituted gluconates; substituted undecanoates; substituted behenates; substituted succinates; substituted gallates; substituted heptanoates; substituted phenylacetates; substituted cinnamates; substituted 2-methylbutyrates; substituted tiglates; corn syrup; isoparaffinic petroleum hydrocarbons; mineral oil; glycerin; mono- and diglycerides and their derivatives; olibanum oil; opopanax oil; peanut oil; polysorbates 20, 60, 65, 80; propylene glycol mono- and diesters of fats and fatty acids; epoxidized soybean oil; hydrogenated soybean oil; sperm oil; and hydrogenated sperm oil.

An example of a UV curable liquid ink composition includes, in weight percent, about 62.9% SR454, 10.8% SR506, 2.9% SR399, 7.8% CN384, 1.9% Special Black 4A, 2.9% ITX, 2.9% Esacure TZT, 5.9% Irgacure 907, and 2% Genorad 16. The Special Black 4A and a portion of the SR454 can be pre-combined to form a pigment concentrate (e.g., 20% Special Black 4A/80% SR454), and the concentrate can be combined with the remaining ingredients to form a liquid ink composition. A second example includes, in weight percent, about 61.1% SR454, 11.9% Actilane 411 (Akzo Nobel), 3.2% SR399, 8.6% CN384, 3.2% ITX, 3.2% Esacure TZT, 6.5% Irgacure 907, and 2.2% Genorad 16. Viscosity measurements were taken for the second example using a Brookfield DV3 rheometer with Rheocalc software (#18 spindle, 60 RPM). The measurements revealed viscosities of 23.0 cps at 50° C.; 19.1 cps at 55° C.; 16.1 cps at 60° C., 13.9 cps at 65° C., 12.1 cps at 70° C., 10.8 cps at 75° C., 9.8 cps at 80° C., and 8.9 cps at 85° C.

Preparing Inks

In some embodiments, to prepare a radiation-curable hot melt ink composition, one can combine all of the composition ingredients except for photoinitiating system components; heat the resulting combination and mill; mix the photoinitiating system components with the liquified combination; and filter the mixture through a 1 μm filter.

Further, to prepare a radiation-curable liquid composition, one can combine all of the composition ingredients; heat the resulting combination, if necessary; and mill.

To prepare pigmented inkjet inks, it is preferable to prepare a concentrate of the chosen pigment in one or more of the ink raw materials. The two main advantages to the pigment concentrate are ease of pigment grinding and reduced process time.

In the pigment concentrate, the total number of pigment particles is increased, which allows for more particle-particle and particle-grinding media collisions, which in turn decreases the amount of time needed to reach the desired particle size. Additionally, in the concentrate the particles have higher odds of coming in contact with dispersant/surfactant molecules. These materials preferably adsorb onto the surface of the particles, e.g., so that the reduced particle size does not increase due to agglomeration. By increasing the odds of particle-dispersant collisions, the grind time can be reduced and the particle size stability can be increased.

To prepare a carbon black pigment concentrate, one can calculate the amount of dispersant needed for the concentrate (the calculation can be based on the desired pigment particle size, the calculated pigment surface area (supplied by the pigment manufacturer), or both); charge the calculated amount of fluid vehicle and dispersant into an appropriate vessel; mix the vehicle and dispersant until fully blended (some gentle heating may be necessary if the dispersant is a solid); move the vehicle/dispersant mixture to a high shear mixer; slowly charge the pigment; and mill the just obtained pigment concentrate.

For a liquid ink, all liquid monomers and oligomers are mixed, and photoinitiators are added to the mixture. If the photoinitiators are solid, they are preferably fully dissolved in the mixture. Then, the pigment concentrate is added to obtain the liquid ink. If necessary, the ink is filtered through a 1 μm filter.

For a solid ink, all solid monomers and oligomers are melted, mixed, and photoinitiators are added to the liquified mixture. If the photoinitiators are solid, they are preferably fully dissolved in the mixture. Then, the pigment concentrate is added to obtain the ink. If necessary, the ink is heated and filtered through a 1 μm filter.

Printing and Curing Methods

A method of printing, e.g., ink jet printing and curing an ink image includes printing a radiation-curable ink composition as described above on a substrate to form an image, and curing the image by exposure to irradiation (e.g., ultraviolet light irradiation). A radiation line source can be used to provide a uniform area of radiation exposure. The line source may include an ultraviolet lamp (e.g., D bulb or H bulb). Other suitable printing and curing means may also be used, such as methods of printing described in: Leach, R. H., Pierce, R. J., The Printing Ink Manual, Blueprint (Chapman & Hall), $5^{th}$ ed., 1993. An example of a printing system is Markem 4000 system available from Markem Corp., N.H.

The specific examples below are illustrative, and not intended to be limiting. All publications, patents, applications, and references cited herein are hereby incorporated by reference in their entirety.

EXAMPLE 1

Hot Melt Ink Compositions and High Speed Printing

Ink compositions with various photoinitiators (listed in Table 1) were prepared and tested as follows:

A 4% dispersion of Sunfast Black 7 in CD406 (Sartomer Corp.) was prepared by: (i) placing 480 g of CD406 into a 600 mL beaker and covering it with foil; (ii) heating the covered beaker in an 80° C. oven until no solid remained; (iii) removing the beaker and placing it into a thermowell for 600 mL beakers, plugging the thermowell into a variable resistor, and setting the resistor for 25 Volts; (iv) monitoring the liquid temperature in the thermowell; adjusting the resistor to hold temperature around 80° C., and not allowing the temperature to increase above 95° C.; (v) starting a low speed mixer with a Cowles blade; (vi) weighing out 20 g Sunfast Black 7; (vii) increasing the mixer speed and slowly adding Sunfast Black 7 (a baffle may be needed to eliminate vortexing); and (viii) mixing at high speed for one hour, and monitoring the temperature during this time. Then 15 or 20 g of samples were prepared, and wrapped in aluminum foil. Each sample was made a draw-down on glossy paper using a #5 Meyer bar. Then the draw-down was passed through a Fusion 300 UV system at 160 ft/min, and was evaluated using an eraser test (discussed below). For a stability test, samples in UV protected scintillation vials were placed in an 80° C. oven, and their viscosity values (or gel formation) were checked daily.

Tables 2 and 3 show the results of testing. The samples containing Irgacure 369 and Irgacure 907 provided relatively high scores in eraser tests, which may be due in part to the increased spectral absorbance and increased number of available radicals. Also, the compositions containing an alpha-cleavage/ITX system (samples A6, A7, and A8) provided higher scores than those only containing Irgacure 1700/TZT. Sample A5 containing a combination of Irgacure 1700, TZT, Irgacure 369, and ITX produced the highest score in the eraser test. Each of the samples had been placed at 80° C. for a stability test. Polymerization occurred in samples A3, A4, A5, A7, and A8, which were the samples containing an alpha-cleavage initiator in conjunction with Irgacure 1700/TZT or containing Irgacure 369/ITX.

TABLE 2

Eraser tests[a].

| Sample | Eraser results init. | Eraser results 24 hr |
|---|---|---|
| A1 | 5 | 6 |
| A2 | 6 | 7 |
| A3 | 8 | 8 |
| A4 | 7 | 7 |
| A5 | 9 | 9 |
| A6 | 8 | 9 |
| A7 | 8 | 8 |
| A8 | 8 | 7 |

[a]Samples were double rubbed 10 times with a polymer eraser and their performance were ranked on a scale of 1–10, 10 being no coating removal and 1 being complete coating removal. Results are presented in tabular form.

TABLE 1

Compositions with various photoinitiators (all numbers are in wt %).

| Sample | A1 | A2 | A3 | A4 | A5 | A6 | A7 | A8 |
|---|---|---|---|---|---|---|---|---|
| 4% Black Dispersion | 50 | 50 | 50 | 50 | 50 | 50 | 50 | 50 |
| Sartomer CD406 | 13.88 | 11.69 | 11.09 | 12.89 | 12.44 | 15.44 | 17.24 | 17.22 |
| Sartomer SR368 | 6.89 | 6.65 | 6.58 | 6.77 | 6.72 | 7.06 | 7.26 | 7.28 |
| Irgacure 1700 (Ciba Geigy) | 2.4 | 3.22 | 1.61 | 1.61 | 1.61 | | | |
| Sartomer Esacure TZT | 4.83 | 6.44 | 3.22 | 3.22 | 3.22 | | | |
| Sartomer CN384 | 7 | 7 | 7 | 7 | 7 | 7 | 7 | 7 |
| Hydroxy Stearic Acid | 15 | 15 | 15 | 15 | 15 | 15 | 15 | 15 |
| Irgacure 907 (Ciba Geigy) | | | 5 | | | 5 | | |
| ITX (First Chemical Corp.) | | | 0.5 | | 0.5 | 0.5 | | |
| Irgacure 369 (Ciba Geigy) | | | | 3.5 | 3.5 | | 3.5 | 3.5 |
| Total | 100 | 100 | 100 | 99.99 | 99.99 | 100 | 100 | 100 |

TABLE 3

Heat stability tests[a].

| Day | A1 | A2 | A3 | A4 | A5 | A6 | A7 | A8 |
|---|---|---|---|---|---|---|---|---|
| 1 | Liquid | Liquid | Liquid | Liquid | Liquid | Liquid | Liquid | Liquid |
| 2 | Liquid | Liquid | Liquid | Liquid | Liquid | Liquid | Gelling | Liquid |
| 5 | Liquid | Liquid | Liquid | Gelling | Gelling | Liquid | Gelling | Gelling |
| 6 | Liquid | Liquid | Gelling | Gelling | Gelling | Liquid | Solid | Solid |
| 7 | Liquid | Liquid | Almost solid | Solid | Solid | Liquid | | |
| 8 | Liquid | Liquid | Solid | | | Liquid | | |

TABLE 3-continued

Heat stability tests[a].

| Day | A1 | A2 | A3 | A4 | A5 | A6 | A7 | A8 |
|---|---|---|---|---|---|---|---|---|
| 9 | Liquid | Liquid | | | | Liquid | | |
| 12 | Liquid | Liquid | | | | Liquid | | |
| 13 | Liquid | Liquid | | | | Liquid | | |
| 14 | Liquid | Liquid | | | | Liquid | | |
| 15 | Liquid | Liquid | | | | Liquid | | |
| 16 | Gelling | Gelling | | | | Liquid | | |
| 20 | Solid | Solid | | | | Liquid | | |
| 23 | | | | | | Liquid | | |
| 27 | | | | | | Liquid | | |
| 33 | | | | | | Solid | | |

[a]Samples were placed into scintillation vials, stored in 80° C. oven, and checked periodically for gelling.

The compositions with various vehicles (listed in Table 4) were prepared and tested as follows:

Differential scanning calorimetry (DSC) melting and freezing point curves for each vehicle were obtained, and the compatibility of the vehicle with CD406 was checked by: (i) melting some CD406 and each of the vehicles in a 120° C. oven (some may not need to be melted); (ii) mixing CD406 and each vehicle together 50/50 in a scintillation vial, and shaking well; (iii) placing the mixed samples in an 80° C. oven for one hour; (iv) looking at each sample and make observations regarding clarity of the sample, any precipitate that had formed, or two distinct layers of liquid (e.g., similar to oil and water). Using a 50/50 blend of CD406 and hydroxy stearic acid (HSA) as a reference, mixtures that showed excessive cloudiness, precipitated waxy material, or an "oil and water" appearance were eliminated from Table 4.

The compositions in Table 4 were prepared in the same manner as described above. All materials were mixed well, and then the pre-melted waxy material was added and shaken vigorously.

TABLE 4

Compositions with various vehicles (all numbers are in wt %).

| Sample | B1 | B2 | B3 | B4 | B5 | B6 | B7 | B8 | B9 | B10 | B11 |
|---|---|---|---|---|---|---|---|---|---|---|---|
| 4% Black Dispersion | 50 | 50 | 50 | 50 | 50 | 50 | 50 | 50 | 50 | 50 | 50 |
| Sartomer CD406 | 12.44 | 12.44 | 12.44 | 12.44 | 12.44 | 12.44 | 12.44 | 12.44 | 12.44 | 12.44 | 12.44 |
| Sartomer SR368 | 6.72 | 6.72 | 6.72 | 6.72 | 6.72 | 6.72 | 6.72 | 6.72 | 6.72 | 6.72 | 6.72 |
| Irgacure 1700 | 1.61 | 1.61 | 1.61 | 1.61 | 1.61 | 1.61 | 1.61 | 1.61 | 1.61 | 1.61 | 1.61 |
| Esacure TZT | 3.22 | 3.22 | 3.22 | 3.22 | 3.22 | 3.22 | 3.22 | 3.22 | 3.22 | 3.22 | 3.22 |
| Sartomer CN384 | 7 | 7 | 7 | 7 | 7 | 7 | 7 | 7 | 7 | 7 | 7 |
| ITX | 0.5 | 0.5 | 0.5 | 0.5 | 0.5 | 0.5 | 0.5 | 0.5 | 0.5 | 0.5 | 0.5 |
| Irgacure 369 | 3.5 | 3.5 | 3.5 | 3.5 | 3.5 | 3.5 | 3.5 | 3.5 | 3.5 | 3.5 | 3.5 |
| Hydroxy Stearic Acid | 15 | | | | | | | | | | |
| KEMAMIDE S-221 (Crompton-Knowled/Witco) | | 15 | | | | | | | | | |
| KEMAMIDE S STEARMIDE (Crompton-Knowled/Witco) | | | 15 | | | | | | | | |
| KEMAMIDE S-180 (Crompton-Knowled/Witco) | | | | 15 | | | | | | | |
| NEUSTRENE 064 (Crompton-Knowled/Witco) | | | | | 15 | | | | | | |
| Industrene 206 | | | | | | 15 | | | | | |
| WITCAMIDE MAS (Crompton-Knowled/Witco) | | | | | | | 15 | | | | |
| WITCAMIDE 5195 (Crompton-Knowled/Witco) | | | | | | | | 15 | | | |
| KEMAMIDE B (Crompton-Knowled/Witco) | | | | | | | | | 15 | | |
| KEMAMIDE E ULTRA (Crompton-Knowled/Witco) | | | | | | | | | | 15 | |
| KEMAMIDE U (Crompton-Knowled/Witco) | | | | | | | | | | | 15 |

The compatibility check showed that precipitates and solidification occurred with samples containing S-Stearamide, Kemamide S-180, and Kemamide B. All other vehicles were compatible at 80° C. Witcamide 5195 was observed to supercool (not solidify immediately upon cooling to room temperature) and was removed from the sample table. Industrene 206 was a liquid at room temperature. Compositions containing Kemamide S-221. (sample B2), Witcamide MAS (sample B7), and Kemamide E (sample B 10) were tested. These samples were drawn down onto glossy, semi-gloss, and plain paper using a heated (120° C.) #5 Meyer rod. Samples were cured at 160 ft/min using a FUSION 300 with a H-bulb. No bleed through was observed on gloss and semi-gloss paper. Minimal amounts of bleed through were observed on plain paper. All three samples gave a flat black appearance. The eraser test was performed on the three samples and gave the following results: B2=8, B7=5, B10=7. The composition containing Kemamide S-221 (Erucyl Stearamide) had a higher melt point. Using Kemamide S-221 did not affect cured properties (as suggested by the eraser test performance).

Compositions in Table 5 with various wt % of photoinitiators were prepared in the same manner as described above. The compositions were made two draw-downs on glossy paper with a #5 Meyer rod (heated to 120° C.); and cured at 160 ft/min using a H-bulb or a D-bulb.

TABLE 5

Compositions with various wt % of photoinitiators (all numbers are in wt %).

| Sample | C1 | C2 | C3 | C4 | C5 | C6 | C7 | C8 |
|---|---|---|---|---|---|---|---|---|
| 4% Black Dispersion | 37.5 | 37.5 | 37.5 | 37.5 | 37.5 | 37.5 | 37.5 | 37.5 |
| Sartomer CD406 | 27.9 | 27 | 26.1 | 25.2 | 27.4 | 26.5 | 25.6 | 24.7 |
| Sartomer SR368 | 7.1 | 7 | 6.9 | 6.8 | 7.1 | 7 | 6.9 | 6.8 |
| KEMAMIDE S-221 | 15 | 15 | 15 | 15 | 15 | 15 | 15 | 15 |
| Sartomer CN384 | 7 | 7 | 7 | 7 | 7 | 7 | 7 | 7 |
| Esacure TZT | 0 | 1 | 2 | 3 | 0 | 1 | 2 | 3 |
| ITX | 0.5 | 0.5 | 0.5 | 0.5 | 1 | 1 | 1 | 1 |
| Irgacure 907 | 5 | 5 | 5 | 5 | 5 | 5 | 5 | 5 |
| Total | 100 | 100 | 100 | 100 | 100 | 100 | 100 | 100 |

As shown in Table 6, the composition containing more TZT provided high scores in the eraser tests. Also the D-bulb produced more durable coatings than the H-bulb.

TABLE 6

Eraser tests.

| Sample | H-Bulb | D-Bulb |
|---|---|---|
| C1 | 7 | 7 |
| C2 | 9 | 9 |
| C3 | 9 | 9 |
| C4 | 10 | 10 |
| C5 | 7 | 8 |
| C6 | 7 | 10 |
| C7 | 9 | 10 |
| C8 | 7 | 9 |

A NOVA 256/80 printhead (Spectra Inc.) was transferred to a high speed drive capable of passing cardboard in front of the printhead at up to 500 ft/min. Attached to the drive was a Fusion 300 UV cure station with a D-bulb. As the NOVA printhead can reach up to 120 ng drop mass, the HDM press was correlated to the drop mass of 80 ng when printed at 300 dpi×300 dpi. To achieve the correct drop mass, the viscosity of the ink was increased. Compositions in Table 7 had viscosity values of at least 10 centipoise.

TABLE 7

Compositions (all numbers are in wt %) and viscosity values.

| Sample | D1 | D2 | D3 |
|---|---|---|---|
| 10% Black Dispersion | 15 | 15 | 15 |
| Sartomer CD406 | 45 | 50 | 55 |
| Sartomer SR368 | 17.25 | 12.25 | 7.75 |
| KEMAMIDE S-221 | 15 | 15 | 15 |
| Sartomer CN384 | 0.25 | 0.25 | 0.25 |
| Esacure TZT | 1 | 1 | 1 |
| ITX | 1 | 1 | 1 |
| Irgacure 907 | 5 | 5 | 5 |
| Viscosity | 21.6 cps | 10.8 cps | 10.6 cps |

Sample D2 was prepared and loaded into the NOVA 256/80 printhead. Measuring drop mass of ink with correct viscosity was performed as follows. Inks were loaded into a NOVA printer with an internal firing sequence setting. One jet was continuously fired into a tared aluminum pan at 10000 Htz for 5 min (do this for 10 jets) and the mass was recorded in grams of ink delivered. The mass was divided by $3 \times 10^6$ drops, and then multiplied the answer by $1 \times 10^9$ ng/g. Finally, an average of 10 readings was taken. If the obtained drop mass was in near 80 ng, this was used for all calculations involving drop mass; however, if the drop mass was >85 or <75 ng, the drive voltage and/or pulse width was adjusted accordingly and the test was repeated.

To improve the jetting temperature stability, the following changes were made. Genorad 16, a stabilizer available from Rahn Corp., was added to the formulation at 2%. Genorad 16 does not require oxygen to function, and is specifically recommended for Black UV curable inks. Special Black 4A with the use of Solsperse 32000 was substituted for Sunfast Black 7 for pigmentation. Low Area Filtration (LAF) tests performed on a color concentrate indicate that the particle size was well below 1.0 $\mu$m. SR399 was substituted for SR368.

The LAF tests were performed on a LAF filter canister (available from Creative Scientific Equipment Corp., Long Beach, Calif.) with compressed air connection head. More specifically, before starting a filtration test, a heating wrap was turned on for 15 min. The canister was heated to 65° C., and was taken out and placed in the heating wrap. A hot dilute sample was poured into the canister. The canister was screwed on the head and attached to a compressed air source at 25 psi or with a regulator. Then the ink collection container was tared, and the compressed air was turned on. After ten min at 25 psi, the compressed air was turned off. The test specification was 65 grams or more of diluted sample in 10 minutes. The filtration curve was rather steep. For example, it could take 5 hours to obtain 5 grams through the filter, 7 hours to obtain 20 grams, 8 hours to obtain 30 grams, and 10 hours to obtain 80 grams.

The formulation and physical properties of Composition 1 are listed in Table 8. In addition, 12 $\mu$m drawdowns of this composition cured at 470 ft/min using a Fusion 300 with a D-bulb and up to 3.5 m/s using an IST 500 W/in system with a D-bulb. No surface inhibition was observed at these cure speeds. Draw-down samples (~10–12 microns thick ink layer) were tested for offset by interleaving samples between sheets of paper and placing said samples into a 3800 kg sheet press cutter followed by cutting through the draw-downs themselves. No offset was observed and no flaking ink at the cut line was observed. The composition was stable at 80° C. in a polypropylene container for 30 days.

TABLE 8

Composition 1.

|  | wt % of pigment concentrate | wt % of materials |
|---|---|---|
| Pigment Concentrate |  | 9.80% |
| (Special Black 4A) | 20.00% | 1.92% |
| (SR454) | 80.00% | 7.69% |
| SR454 |  | 0.31% |
| CD406 |  | 51.07% |
| SR399 |  | 18.89% |
| Kemamide S-221 |  | 5.00% |
| CN384 |  | 6.86% |
| ITX |  | 0.98% |
| Esacure TZT |  | 0.98% |
| Irgacure 907 |  | 4.90% |
| Genorad 16 |  | 1.96% |
|  |  | 100% | viscosity (at 60 rpm)

| Temperature | Viscosity |
|---|---|
| 60 | 1000 |
| 65 | 16.3 |
| 70 | 14.4 |
| 75 | 11.9 |
| 80 | 10.7 |
| 85 | 9.95 |
| 90 | 9.7 |

EXAMPLE 2

Liquid Ink Compositions and High Speed Printing

Ink compositions listed in Table 9 were prepared and tested as described above.

TABLE 9

Liquid ink compositions (all numbers are in wt %) and viscosity values.

| Sample | E1 | E2 | E3 | E4 | E5 |
|---|---|---|---|---|---|
| Variation of TK0204 |  |  |  |  |  |
| Sample I[a] | 10% |  | 10% | 10% |  |
| Sample II[b] |  | 10% |  |  | 10% |
| 10% Black* |  |  |  |  |  |
| (Sunfast Black 7) |  |  |  |  |  |
| (CN384) | 4% | 4% |  | 4% |  |
| (SR368) |  |  |  |  |  |
| SR494 |  |  | 10% |  |  |
| SR454 | 63% | 63% | 53% | 53% | 53% |
| Sartomer SR9003 |  |  |  | 10% | 10% |
| Sartomer SR306 |  |  |  |  |  |
| Sartomer SR247 | 10% | 10% | 10% | 10% | 10% |
| TZT | 1% | 1% | 1% | 1% | 1% |
| ITX | 1% | 1% | 1% | 1% | 1% |
| Irg 907 | 5% | 5% | 5% | 5% | 5% |
|  | 94% | 94% | 90% | 94% | 90% |
| Viscosity at 70° C. (cPs) |  | 11.4 |  |  |  |
| Viscosity at 75° C. (cPs) |  |  |  |  |  |
| Eraser | Pass | Pass | Pass | Pass | Pass |
| Smear | Pass | Pass | Fail | Fail | Fail |

[a]Sample I: Sunfast Black 7 (20%), SR386 (40%), CN384 (40%).
[b]Sample II: Sunfast Black 7 (20%), SR399 (40%), CN384 (40%).

A 600 g batch of sample E2 was prepared for further testing. In doing so, a larger batch of sample II was prepared using the Neztch Mini-Zeta mill. The procedure included making a pre-dispersion using the Silverson Rotor-Stator, then transferring the mix to the Neztch mill. The mill was run for two hours at 50° C. and 2000 rpm. Filtration of 600 g of the composition took three filter changes. A final composition: SR454 (67.69%), SR247 (10.71%), SR399 (4.24%), CN384 (8.24%), Sunfast Black 7 (2.12%), ITX (1.0%), Esacure TZT (1.0%), and Irgacure 907 (5.0%), was obtained and had a viscosity of 10.6 cPs at 70° C. and 12.2 cPs at 65° C. A cure test on a 12 μm draw-down confirmed that adequate cure response occurred at 305 ft/min.

Compositions containing using alternative photoinitiators were also tested. Those photoinitiators were CN373, DETX (diethylthioxanthone) (Aceto Corp.) in place of ITX, PBZ (4-phenylbenzophenone) in place of TZT, EDB (ethyl-4-dimethylamino benzoate) in place of CN384, and Photocure 55 (O-methyl benzoyl benzoate) (Aceto Corp.) in place of TZT). The photoinitiators were ranked as follows, from the highest score to the lowest score in eraser tests described above: DETX; CN373 and Photocure 55 tied; RW1717; PBZ; EDB. Accordingly, a new ink was made containing 7% CN373, 1% DETX, 1% Photocure 55, and 5% Irgacure 907. The components (all numbers are in wt %) and their upper and lower limits are listed in Table 10.

TABLE 10

| Component | Name | Low Level | High Level |
|---|---|---|---|
| A | CN373 | 1 | 10 |
| B | DETX | 0.5 | 3 |
| C | Photocure 55 | 0.5 | 3 |
| D | Irg 907 | 1 | 6 |
| E | SR454 2% Black | 78 | 97 |
| Total = |  | 100 |  |

Genorad 16 is an inhibitor from Rahn Corporation that functions in the absence of oxygen. Initial tests of Genorad 16 showed that it did not adversely affect cure speed. A final formulation was set, Composition 2. Breakdown of components were listed in Table 11. Twelve micron thick coatings of Composition 2 cured at 470 ft/min using a Fusion 300 with a D-bulb and up to 650 ft/min using an IST 500 W/in system with a D-bulb.

TABLE 11

Composition 2.

|  | wt % of pigment concentrate | wt % of materials |
|---|---|---|
| Pigment Concentrate |  | 9.8% |
| (Special Black 4A) | 20.0% | 1.9% |
| (SR454) | 80.0% | 7.7% |
| SR454 |  | 55.2% |
| Sartomer SR506 |  | 10.8% |
| SR399 |  | 2.9% |
| CN384 |  | 7.8% |
| ITX |  | 2.9% |
| Esacure TZT |  | 2.9% |
| Irgacure 907 |  | 5.9% |
| Genorad 16 |  | 2.0% |
|  |  | 100% |

Viscosity (at 60 rpm)

| Temperature | Viscosity |
|---|---|
| 25 | 78.4 |
| 30 | 58.2 |
| 35 | 43.6 |
| 40 | 33.9 |
| 45 | 27 |
| 50 | 21.8 |
| 55 | 18.1 |

TABLE 11-continued

| | |
|---|---|
| 60 | 15.2 |
| 65 | 13 |
| 70 | 11.2 |
| 75 | 9.9 |
| 80 | 8.9 |

The following procedures can be used to prepare inks of this invention:

Preparation of a Carbon Black Pigment Concentrate

1. Calculate the amount of dispersant needed for the concentrate. This calculation can be based on the desired pigment particle size, the calculated pigment surface area (supplied by the pigment manufacturer), or both.
2. Charge the calculated amount of fluid vehicle and dispersant into an appropriate vessel;
3. Mix the vehicle and dispersant until fully blended (some gentle heating may be necessary if the dispersant is a solid). This step usually takes 10–15 minutes.
4. Move the vehicle/dispersant mixture to a high shear mixer. A Cowles blade or rotor-stator work well. Begin mixing at 2500–3500 rpm.
5. Slowly charge the pigment. Charging pigment to quickly can result in pigment clumps that do not disperse well. After all pigment has been charged, increase mixer speed to 4000 rpm.
6. Disperse at 4000 rpm for 30 minutes. Monitor and keep temperature below 70° C.
7. Remove batch from mixer and transfer to a horizontal medial mill.
8. Mill the batch at 2000 rpm using 0.5 mm ceramic media for 3 hours.
9. At the end of 3 hours, remove a sample of the pigment concentrate and perform a filtration test. The test helps to provide particles that are below 1.0 μm. If the concentrate passes filtration, remove the batch. If the concentrate does not pass filtration, continue to mill. Re-test the concentrate every 30 minutes until the filtration test is passed.
10. Set aside the concentrate for use in the let down.

Preparation of a Black UV Inkjet Ink

A. Blending Materials for a Liquid Ink
a. In an appropriately sized vessel, blend all the liquid monomers and oligomers. Use of a standard propeller blade is adequate for blending. Work in an area that is UV protected (film that blocks 190 nm to 450 nm can be wrapped around existing lights).
b. Charge the photoinitiators. If the photoinitiators are liquid, blend for 10 min. If the photoinitiators are solid, blend until all solids are fully dissolved.
c. Charge the required amount of pigment concentrate. Blend for 20–30 minutes.
d. Remove ink from mixer. Filter the finished in through a 1.0 μm filter in a pressurized filtration apparatus. The ink is preferably filtered into a container cleaned with filtered ionized air. This assures that all particles and contaminants greater than 1.0 μm are removed.

B. Blending Materials for a Solid Ink
a. Pre-melt all solid monomers and oligomers in an oven.
b. Charge melted solid and liquid monomers and oligomers into an appropriately sized heated vessel. The vessel and mixture temperature preferably does not exceed 85° C. Blend the materials with a standard propeller blade.
c. Charge the photoinitiators. If the photoinitiators are liquid, blend for 10 min. If the photoinitiators are solid, blend until all solids are fully dissolved.
d. Charge the required amount of pigment concentrate. Blend for 20–30 minutes.
e. Remove ink from mixer. Filter the finished in through a 1.0 μm filter in a heated pressurized filtration apparatus. The ink is preferably filtered into a container cleaned with filtered ionized air. This helps to remove particles and contaminants greater than 1.0 μm.

EXAMPLE 3

A Throughput Speed Prediction Model

The following example illustrates a procedure for developing a model that can be used to predict throughput speed of an UV ink or coating based on the total peak irradiance and lamp diameter of the UV source. Before developing a prediction model, the spectral absorption of the ink or coating are determined so that an UV lamp that emits radiation in the appropriate UV ranges can be chosen. When obtaining the spectral absorption of an ink or coating, all formulation components, not just photoinitiators, are considered.

As used below, an ink or coating is considered "cured" if the ink or coating can withstand predetermined performance test(s), which can vary among ink/coating applications. The performance test(s) is preferably well-defined. The "lamp diameter" is the inner diameter of the lamp used in the UV source. The "elliptical reflector" is a half ellipse used as a reflector in the UV source. Three-quarter ellipse reflectors and parabolic reflectors are not used in this model. The "focal width" is the footprint of peak irradiance; for this model, the focal width is half the lamp diameter.

The equipment used for this model include an UV PowerMap with Powerview software (supplied by EIT Inc., Sterling Va.); an UV source that incorporates a half ellipse reflector; an UV lamp with a spectral output that best matches the ink or coating to be tested; and a variable speed belt drive.

Data Collection

A. UV Source
1. Place the selected UV lamp into the UV source.
2. Position the UV source so that it is at the factory recommended focal height above the variable speed belt drive. The lamp should be oriented perpendicular to the direction of the belt.
3. Obtain an irradiance profile of the UV source. Note the speed of the belt drive, and obtain all irradiance profiles at this speed.
4. Increase the distance of the UV source from the belt drive incrementally 5–10 times. Note the out-of-focus distances for future reference. At each new distance, obtain an irradiance profile at the speed determined in step 3. The irradiance profiles serve as all of the irradiance information for the prediction model. Save all of the irradiance data for analysis.

B. Curing
1. Provide one or more tests that will determine if the ink or coating is cured. For best results, each test is well-defined and quantifiable. Do not deviate from the pre-determined tests and test conditions.
2. Determine the application method of the ink or coating. Determine the thickness of the coating. Applying the ink or coating in the exact same manner every time reduces variations in film thickness, and increases accuracy and precision.
3. With the chosen UV source and lamp in focus, determine the maximum throughput speed at which the ink or coating cures. Note of the speed and use this throughput speed for all the curing experiments described below.
4. Cure the printed or coated films at the throughput speed determined in section B.3 at the focal distances determined in section A.4. Cure at least three samples at each condition to increase reproducibility.
5. Determine if the ink or coating is cured by performing the predetermined test(s). Record the test results for analysis.

Data Analysis

A. Irradiance Profile
1. Determine the irradiance value at half the lamp diameter for the highest peak (UVA, UVB, UVC, or UVV).
   a. Look up the lamp diameter for the source being used and convert the diameter into inches if necessary. Divide the lamp diameter by 2, which is half the lamp diameter.
   b. From the irradiance profile, determine the time required to travel half the lamp diameter. Find the center of the peak, and add and subtract half of this time from the center time value.
   c. Determine the average irradiance value at each time. This is taken as the irradiance at half lamp diameter.
   d. Subtract the irradiance at half diameter from the peak irradiance. Calculate the percentage of the peak irradiance that remains, and record this value for future calculations.

Figure 1:
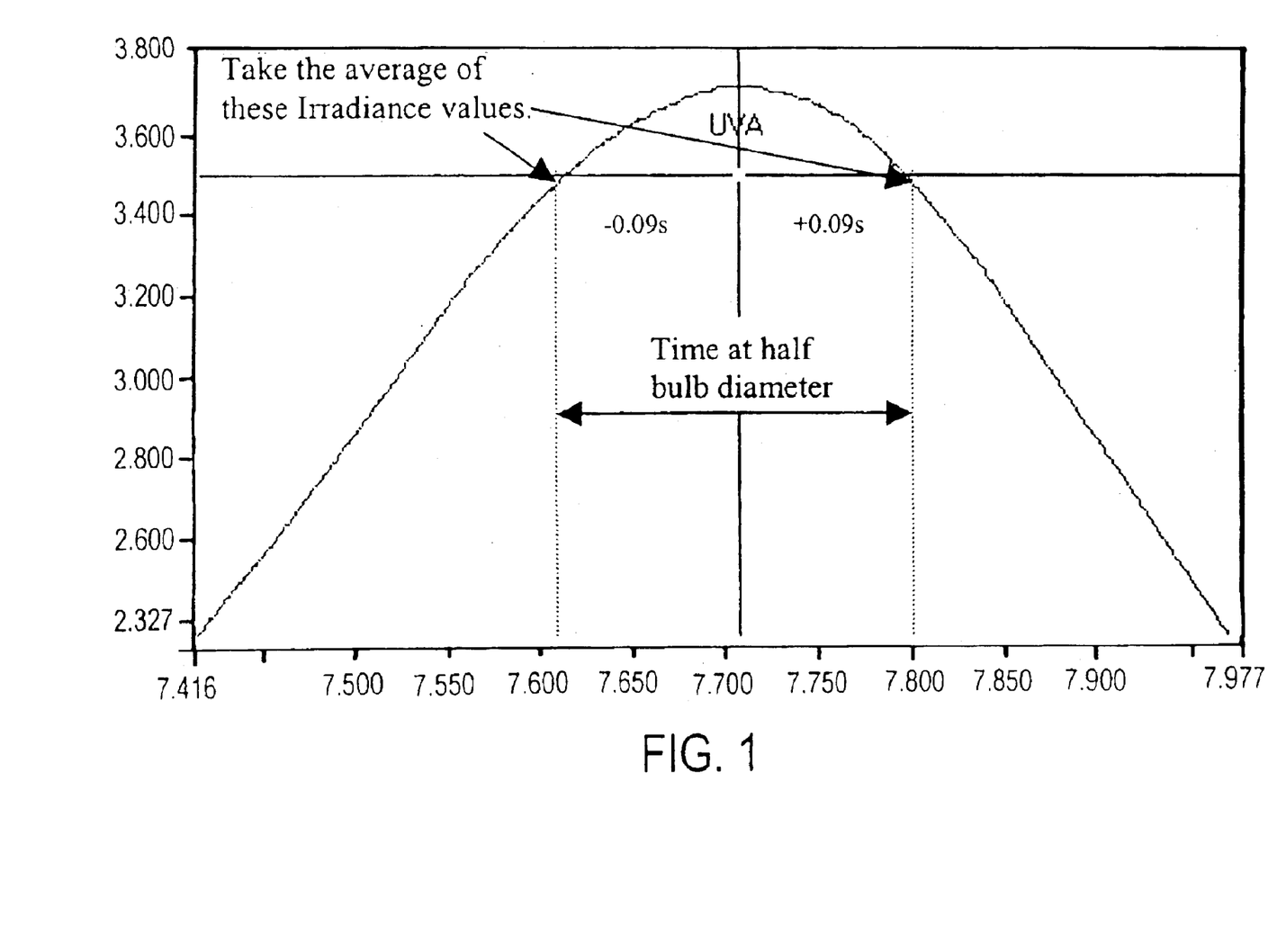
FIG. 1 is a plot of peak irradiance versus time.

A graphic representation of the above procedure is illustrated in FIG. 1. The UVA peak of a Fusion 300 D-lamp with diameter of 9 mm (0.36 inches) was analyzed. Irradiance data was taken at 1.0 ips to simplify calculations. At 1.0 ips, the time required to travel half the lamp diameter (0.18 inches) is 0.18 seconds. Adding 0.09 seconds to one side of the peak and subtracting 0.09 seconds to the other side of the peak produces the diagram in FIG. 1. The average of the irradiance values where the curve is intersected is the irradiance at half lamp diameter. In this example, the value is approximately equal to 94% of the UVA peak irradiance.

2. Throughput Speed Calculation
   a. Set up a table as shown below (Table 12). List the distances above the focus that were used in the first column and the corresponding total peak irradiance values in the second column.

TABLE 12

| Focal Height (mm) | Peak Irradiance (mW/cm$^2$) | Focal Width (inches) | Exposure time to focal width (s) | Calculated throughput speed (ips) | Pass all cure tests? |
|---|---|---|---|---|---|
| 0 | 8000 | | | | |
| 10 | 6340 | | | | |
| 19 | 4340 | | | | |
| 23 | 3882 | | | | |
| 33 | 3020 | | | | |
| 43 | 2328 | | | | |
| 63 | 1638 | | | | |
| 80 | 1267 | | | | | b. The focal width for the source when in focus is half the lamp diameter in inches. The focal width of the out-of-focus data is determined by multiplying the time spent at X% of the highest peak (as determined in section A.1.d) by the throughput speed that the irradiance profile was taken. For example, if the time at 94% of UV peak irradiance is 0.45 s and the irradiance data was taken at 4.0 ips, the focal width is 1.8 inches.
   c. The exposure time at focal width is the time the ink or coating spends in the focal width when cured at the maximum possible rate. Use Equation 1 below to determine these values. If the cure rate for an ink or coating is 10 ips, and the focal width is 1.8 inches, the exposure time is 0.18 seconds.

$$\text{Exposure time (s)} = \text{focal width (inches)}/\text{cure rate (ips)} \quad (1)$$

d. Calculate the actual throughput speed using Equation 2 below.

$$\text{Adjusted belt speed (ips)} = (\text{half lamp diameter (in)}/\text{time at peak (s)}) \quad (2)$$

e. The last column indicates if the ink or coating that was exposed at those conditions was successfully cured.
   f. Complete the remaining columns on the table.

An exemplary table is shown below (Table 13). The irradiance data and the maximum cure speed were both 1.0 ips; therefore, the focal widths and exposure times have identical values. Note that the calculated throughput speed differs significantly from the actual speed at which the data was taken. This is the throughput speed necessary to cure if the source used had X peak irradiance when focused. For example, a UV source that emits 4340 mW/cm$^2$ total peak irradiance can cure this ink at 0.26 ips.

TABLE 13

Figure 2:
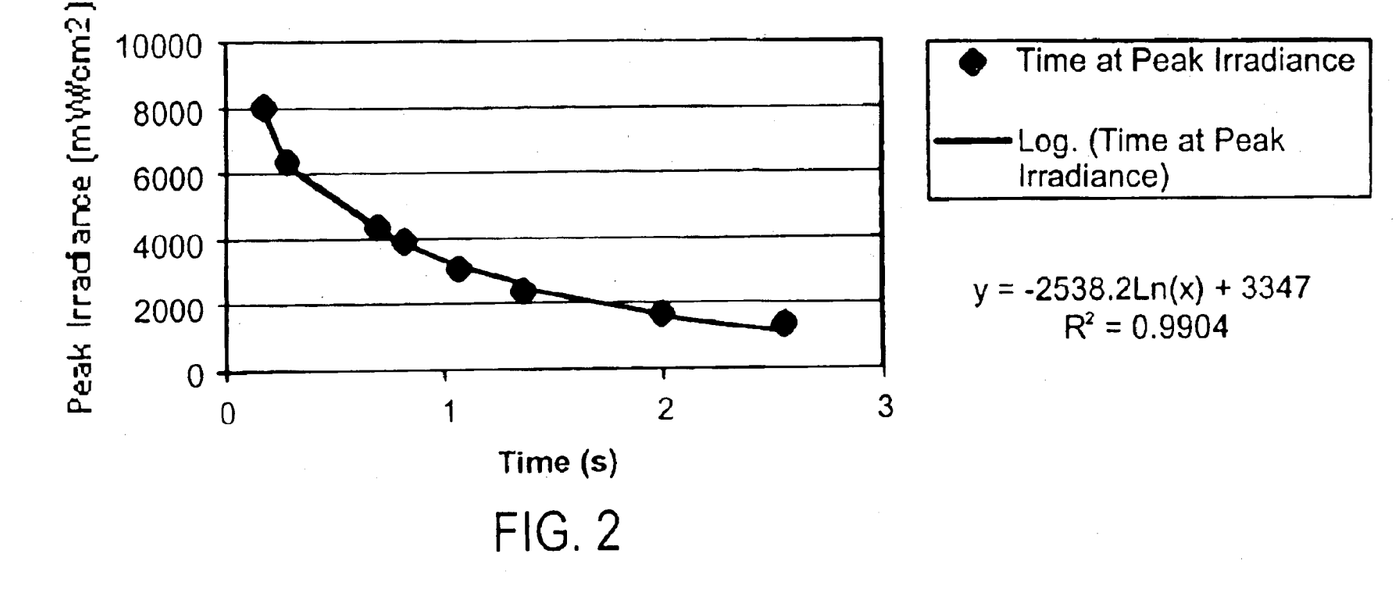
FIG. 2 is a plot of peak irradiance versus exposure time to cure.

| Focal Height (mm) | Peak Irradiance (mW/cm$^2$) | Focal Width (inches) | Exposure time to focal width (s) | Calculated throughput speed (ips) | Pass all cure tests? |
|---|---|---|---|---|---|
| 0 | 8000 | 0.18 | 0.18 | 1.00 | Y |
| 10 | 6340 | 0.278 | 0.278 | 0.65 | Y |
| 19 | 4340 | 0.694 | 0.694 | 0.26 | Y |
| 23 | 3882 | 0.82 | 0.82 | 0.22 | Y |
| 33 | 3020 | 1.045 | 1.045 | 0.17 | Y |
| 43 | 2328 | 1.35 | 1.35 | 0.13 | Y |
| 63 | 1638 | 1.98 | 1.98 | 0.09 | N |
| 80 | 1267 | 2.56 | 2.56 | 0.07 | N | g. Plot exposure time at focal width vs. peak irradiance for all points that pass the cure tests. Perform a regression analysis. The equation of the curve relates the exposure time required to cure for any given total peak irradiance. An example is shown in FIG. 2.

Building the Prediction Model
1. Solve the equation from the graph in section 2.g for time.
2. The throughput speed is defined by Equation 3

$$\text{Throughput speed} = \text{Focal width}/\text{time} \quad (3)$$

The focal width is defined as half the lamp diameter (0.5 d). Substitute 0.5 d for focal width and the equation from the graph for time for a throughput speed prediction equation. An example is shown below.

$$t = e^{(I-(3347mW/cm2)/-2538.2mW/cm2-s)} \quad (4)$$

$$\text{Throughput speed } (ips) = 0.05 \, d/e^{(I-(3347mW/cm2)/-2538.2mW/cm2-s)} \quad (5)$$

For any total peak irradiance and lamp diameter in inches, an approximate throughput speed can be calculated.

Additional information can be found, e.g., in R. W. Stowe, *Radiometry and Methods in UV Processing*, Fusion UV Systems, Inc., RadTech 2000 Technical Proceedings, pp. 114; R. W. Stowe, *Effects of UV Exposure Conditions on Speed, Depth of Cure, and Adhesion*, Radtech 2002; R. Bao, S. Jonsson, *Uniformity of Conversion and Improvements in Film Properties as a Function of Absorbed Light Intensity-A light Intensity Dependence Study*, Radtech 2002; R. W. Stowe, *Effects of UV Exposure Conditions on Speed, Depth of Cure, and Adhesion*, Radtech 2002; R. Bao, S. Jonsson, *Uniformity of Conversion and Improvements in Film Properties as a Function of Absorbed Light Intensity-A light*

*Intensity Dependence Study*, Radtech 2002; and R. W. Stowe, *Radiometry and Methods in UV Processing*, Fusion UV Systems, Inc., RadTech 2000 Technical Proceedings, pp. 114.

EXAMPLE 4

The following example applies a throughput rate prediction model to a black pigmented UV curable inkjet ink ("Sample X"). Sample X includes, in weight percent, 53.00% CD406, 0.32% SR454, 19.61% SR399, 7.12% CN384, 2.93% SR9003, 0.71% Solsperse 32000, 1.96% Special Black 4A, 1.02% Firstcure ITX, 1.02% Esacure TZT, 5.09% Irgacure 907, 2.03% Genorad 16, and 5.19% Kemamide S-221. Sample X is capable of curing at high speeds, e.g., speeds up to 2.3 m/s have been achieved using a Fusion 300 UV radiation source with a D-bulb (iron doped medium pressure mercury). In some cases, Sample X may be used with UV sources from other manufacturers, and therefore, recommended throughput rates for other UV sources are preferably available. Accordingly, the throughput rate prediction model presented above was applied to Sample X.

For this example, UV irradiance profiles were obtained using an UV PowerMap with Powerview S/W. Supplied by EIT. Radiation sources included a Fusion 300 system with a silver elliptical reflector (Fusion UV Systems); a Fusion 450 system with a silver elliptical reflector (Fusion UV Systems); and an American UV variable power 6-inch lamp with elliptical reflector (American UV). The UV lamp type used for all experiments was an iron doped medium pressure mercury vapor quartz bulb. The Fusion bulb was designated a "D-bulb". The American UV bulb was designated a metal halide lamp.

Rectangular prints of Sample X were jetted (at about 77° C.) with a Galaxy 256/30 (Spectra Inc.) printhead on glossy, matte, and open stock paper, and cured at 470 fpm under a focused Fusion 300 system with a D-bulb. Cured samples were subjected to a variety of adhesion tests. The Fusion 300 irradiator was raised incrementally out of focus. At each focal height, prints on each type of paper were cured at 470 fpm and subjected to the same adhesion tests. Adhesion results are shown in Table 16.

The crock test included placing the prints in a crockmeter (A.A.T.C.C. Crockmeter, Model CM 1, available from Atlas Electric Devices Co.), and stroking the prints at one psi with a "finger" covered with a white cotton test cloth (A.A.T.C.C. Test Fabrics, Crockmeter Squares). The prints were stroked with ten double rubs to evaluate adhesion and durability.

The eraser test was similar to the crock test, except that the test cloth was replaced with a pencil eraser. For the eraser test plus 200 grams, an additional 200-gram weight was applied to the finger.

The finger nail scratch test involved scratching the prints with a thumb nail to determine whether the prints flaked off the paper.

The double fold chip and crack test included folding the paper across the print in half, and then folding the folded paper across the first fold and the print to form two creases. The doubly folded prints were evaluated for cracks and signs of flakes or chips. The double fold, weighted, test was similar to the double fold chip and crack test, but a ten pound, four ounce weight was placed on the doubly folded prints prior to evaluation.

The smear test included rubbing the prints with a finger to determine whether the prints smeared or offset.

The Sutherland rub tester (4 lb weight) test included testing the rub resistance of the prints using a Sutherland® Rub Tester (Danilee Co., San Antonio, Tex.) with a four pound weight. The prints were rubbed with a cotton fabric for ten strokes at a low speed according to the manufacturer's instructions.

For each test, prints were evaluated on a scale from one to five, with one indicating a fail or poor adhesion, and a five indicating no removal of ink visible.

Referring to Table 16, the finger nail scratch and double fold chip and crack results declined when the irradiator was 62 mm out of focus. Therefore, the data at 62 mm and 72 mm out of focus were not be included in developing a throughput prediction model. Irradiance profiles for all focal heights, including in focus, were obtained with an UV PowerMap.

The profiles of focal heights that produced adequate cure (pass all adhesion tests) were analyzed. At a value of half the lamp diameter, the UVA irradiance of a focused source was approximately 6% less than the peak. The width at 6% below UVA peak irradiance of each irradiance profile was determined in seconds. Multiplying this time by the rate in ips at which the profile was obtained gives the width of irradiation at 6% below the UVA peak in inches. This value was taken as the "focal width". Exposure time at 94 ips (470 fpm) for each profile's focal width was determined using Equation 6.

$$\text{Exposure time (s)} = \text{focal width (inches)}/94 \text{ ips} \quad (6)$$

Focal width and exposure time values are listed in Table 14.

TABLE 14

Sample X UV Curing Data at 94 ips (470 fpm) (Fusion 300, D-bulb)

| Focal Offset (mm) | Peak Irradiance | Focal Width (inches) | Focal Width (feet) | Time (s) | Time (min) | Calculated belt speed (fpm) | Adhesion? |
|---|---|---|---|---|---|---|---|
| 0 | 8272 | 0.18 | 0.0150 | 0.00191489 | 3.19149E−05 | 470.0 | Pass |
| 10 | 6242 | 0.28 | 0.0233 | 0.00297872 | 4.96454E−05 | 302.1 | Pass |
| 19 | 4196 | 0.7 | 0.0583 | 0.00744681 | 0.000124113 | 120.9 | Pass |
| 26 | 3296 | 0.98 | 0.0817 | 0.01042553 | 0.000173759 | 86.3 | Pass |
| 52 | 1887 | 1.81 | 0.1508 | 0.01925532 | 0.000320922 | 46.7 | Pass |
| 62 | 1593 | 1.98 | 0.1650 | 0.02106383 | 0.000351064 | 42.7 | Fail |
| 72 | 1374 | 2.39 | 0.1992 | 0.02542553 | 0.000423759 | 35.4 | Fail |

Adjusted belt speeds were then determined by dividing the focal width of the focused source in feet by the exposure time in minutes.

$$\text{Adjusted belt speed (fpm)} = 0.0150 \text{ ft/exposure time (minutes)} \quad (7)$$

Figure 3:
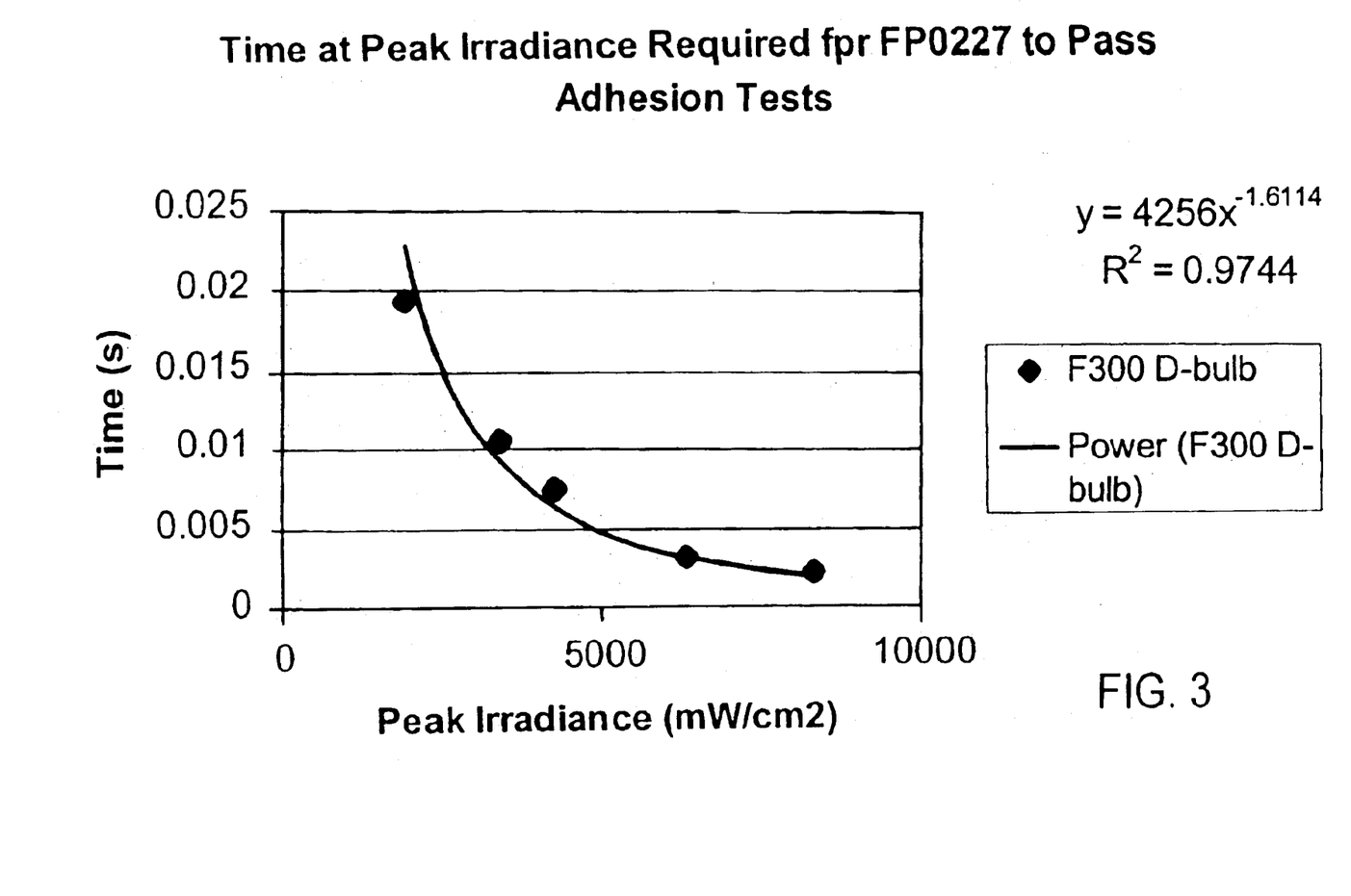
FIG. 3 is a plot of time versus peak irradiance.

A plot of exposure time in seconds required to pass adhesion testing versus total peak irradiance is shown in FIG. 3.

The exposure time required, in seconds, to pass adhesion testing at any given total peak irradiance is defined by Equation 8.

$$t = (4256 \text{ s-cm}^2/\text{mW}) I^{-1.6114} \quad (8)$$

where I is the total peak irradiance in mW/cm².

The throughput rate is defined as the "focal width" divided by time, i.e., $$\text{Throughput rate} = \text{focal width}/\text{time} \quad (9)$$

For a focused UV source having a half ellipse reflector, half the lamp diameter can be substituted for focal width and Equation 8 can be substituted for time giving:

$$\text{Throughput Rate (ips)} = 0.5 \, d(\text{in})/(4256 \text{ s-cm}^2/\text{mW}) I^{-1.6114} \quad (10)$$

Equation 10 was used to calculate throughput values for total peak irradiance readings between 900 mW/cm² and 15000 mW/cm² with 9 mm, 11 mm, and 22 mm UV lamps. Throughput data for Sample X using a medium pressure iron doped mercury lamp set in a half ellipse reflector are shown in Table 17, which shows throughput rates as a function of peak irradiance and lamp diameter.

Three throughput rates from Table 17 were evaluated to check the correlation of the model to actual cure data. The Fusion 450 system with a 9 mm ID D-bulb delivered 900 mW/cm² total peak intensity when operating at 35% power. The calculated throughput speed from Table 17 is 12 fpm. The American UV unit with a 22 mm ID metal halide lamp delivered 1800 mW/cm² at 200 Wpi input power and 3500 mW/cm² at 300 Wpi input power, resulting in calculated throughput rates of 90 fpm and 265 fpm, respectively.

Test prints on glossy and matte paper were evaluated for adhesion after being subjected to the predicted cure conditions. Results are shown below in Table 15.

TABLE 15

| | Paper Finish | Crock Test 1 lb/sq. in. | Eraser Test 1 lb/sq. in. | Eraser Test 1 lb/sq. in. plus 200 g | Finger nail scratch | Double fold chip and crack | Double fold, weighted | Smear | Sutherland Rub Tester, 4 lb weight |
|---|---|---|---|---|---|---|---|---|---|
| | | | | American Ultraviolet | | | | | |
| 200 wpi | Dull | 4 | 4 | 4 | 3 | 3 | Pass | 4 | 4 |
| 90 fpm | Gloss | 4 | 4 | 4 | 3 | 3 | Pass | 4 | 4 |
| 300 wpi | Dull | 4 | 4 | 4 | 3.5 | 3.5 | Pass | 4 | 4 |
| 265 fpm | Gloss | 4 | 4 | 4 | 3.5 | 3.5 | Pass | 4 | 4 |
| | | | | Fusion 450 35% Power | | | | | |
| 12 fpm | Dull | 4 | 4 | 4 | 3.5 | 3.5 | Pass | 4 | 4 |
| | Gloss | 4 | 4 | 4 | 3.5 | 3.5 | Pass | 4 | 4 |
| | | | | Fusion 300 (control) | | | | | |
| 470 fpm | Dull | 4 | 4 | 4 | 2 | 3 | Pass | 4 | 4 |
| | Gloss | 4 | 4 | 4 | 2 | 3 | Pass | 4 | 4 |

All three tests rates performed equal to or better than the control. For a UV source having a half ellipse reflector, in which the lamp diameter and total peak irradiance are known, the throughput model can provide a good prediction of maximum throughput speed for Sample X.

TABLE 16

| Focal Height (mm) | Paper Finish | Crock Test 1 lb/Sq. in. | Eraser Test 1 lb/sq. in. | Eraser Test 1 lb/sq. in. plus 200 g | Finger nail scratch | Double fold chip and crack | Double fold, weighted | Smear | Sutherland Rub Tester, 4 lb weight |
|---|---|---|---|---|---|---|---|---|---|
| 0 | Dull | 4 | 4 | 4 | 2 | 3 | Pass | 4 | 4 |
| | Gloss | 4 | 4 | 4 | 2 | 3 | Pass | 4 | 4 |
| | Uncoated | 4 | 4 | 4 | 4 | 4 | Pass | 4 | 4 |
| 10 | Dull | 4 | 4 | 4 | 2 | 3 | Pass | 4 | 4 |
| | Gloss | 4 | 4 | 4 | 2 | 3 | Pass | 4 | 4 |
| | Uncoated | 4 | 4 | 4 | 4 | 4 | Pass | 4 | 4 |
| 19 | Dull | 4 | 4 | 4 | 2 | 3 | Pass | 4 | 4 |
| | Gloss | 4 | 4 | 4 | 2 | 3 | Pass | 4 | 4 |
| | Uncoated | 4 | 4 | 4 | 4 | 4 | Pass | 4 | 4 |
| 26 | Dull | 4 | 4 | 4 | 2 | 3 | Pass | 4 | 4 |
| | Gloss | 4 | 4 | 4 | 2 | 3 | Pass | 4 | 4 |
| | Uncoated | 4 | 4 | 4 | 4 | 4 | Pass | 4 | 4 |
| 52 | Dull | 4 | 4 | 4 | 2 | 3 | Pass | 4 | 4 |
| | Gloss | 4 | 4 | 4 | 2 | 3 | Pass | 4 | 4 |
| | Uncoated | 4 | 4 | 4 | 4 | 4 | Pass | 4 | 4 |
| 62 | Dull | 4 | 4 | 4 | 1 | 2 | Pass | 4 | 4 |
| | Gloss | 4 | 4 | 4 | 1 | 3 | Pass | 4 | 4 |
| | Uncoated | 4 | 4 | 4 | 4 | 4 | Pass | 4 | 4 |

TABLE 16-continued

| Focal Height (mm) | Paper Finish | Crock Test 1 lb/Sq. in. | Eraser Test 1 lb/sq. in. | Eraser Test 1 lb/sq. in. plus 200 g | Finger nail scratch | Double fold chip and crack | Double fold, weighted | Smear | Sutherland Rub Tester, 4 lb weight |
|---|---|---|---|---|---|---|---|---|---|
| 72 | Dull | 4 | 4 | 4 | 1 | 2 | Pass | 4 | 4 |
|  | Gloss | 4 | 4 | 4 | 1 | 3 | Pass | 4 | 4 |
|  | Uncoated | 4 | 4 | 4 | 4 | 4 | Pass | 4 | 4 |

| | Lamp diameter: 9 mm (0.36 inches) | | | Lamp diameter: 11 mm (0.43 inches) | | | Lamp diameter: 22 mm (0.88 inches) | | |
|---|---|---|---|---|---|---|---|---|---|
| Peak Irradiance | ips | fpm | m/s | ips | fpm | m/s | ips | fpm | m/s |
| 900.00 | 2.4 | 12.2 | 0.06 | 2.9 | 14.6 | 0.07 | 6.0 | 29.8 | 0.15 |
| 1800.00 | 7.4 | 37.2 | 0.19 | 8.9 | 44.5 | 0.23 | 18.2 | 91.0 | 0.46 |
| 2000.00 | 8.8 | 44.1 | 0.22 | 10.5 | 52.7 | 0.27 | 21.6 | 107.8 | 0.55 |
| 2500.00 | 12.6 | 63.2 | 0.32 | 15.1 | 75.5 | 0.38 | 30.9 | 154.5 | 0.78 |
| 3000.00 | 17.0 | 84.8 | 0.43 | 20.3 | 101.3 | 0.51 | 41.4 | 207.2 | 1.05 |
| 3500.00 | 21.7 | 108.7 | 0.55 | 26.0 | 129.8 | 0.66 | 53.1 | 265.7 | 1.35 |
| 4000.00 | 27.0 | 134.8 | 0.68 | 32.2 | 161.0 | 0.82 | 65.9 | 329.4 | 1.67 |
| 4500.00 | 32.6 | 162.9 | 0.83 | 38.9 | 194.6 | 0.99 | 79.7 | 398.3 | 2.02 |
| 5000.00 | 38.6 | 193.1 | 0.98 | 46.1 | 230.6 | 1.17 | 94.4 | 472.0 | 2.40 |
| 5500.00 | 45.0 | 225.1 | 1.14 | 53.8 | 268.9 | 1.37 | 110.1 | 550.4 | 2.80 |
| 6000.00 | 51.8 | 259.0 | 1.32 | 61.9 | 309.4 | 1.57 | 126.6 | 633.2 | 3.22 |
| 6500.00 | 58.9 | 294.7 | 1.50 | 70.4 | 352.0 | 1.79 | 144.1 | 720.4 | 3.66 |
| 7000.00 | 66.4 | 332.1 | 1.69 | 79.3 | 396.6 | 2.02 | 162.3 | 811.7 | 4.12 |
| 7500.00 | 74.2 | 371.1 | 1.89 | 88.7 | 443.3 | 2.25 | 181.4 | 907.2 | 4.61 |
| 8000.00 | 82.4 | 411.8 | 2.09 | 98.4 | 491.9 | 2.50 | 201.3 | 1006.6 | 5.11 |
| 8500.00 | 90.8 | 454.1 | 2.31 | 108.5 | 542.3 | 2.76 | 222.0 | 1109.9 | 5.64 |
| 9000.00 | 99.6 | 497.9 | 2.53 | 118.9 | 594.7 | 3.02 | 243.4 | 1217.0 | 6.18 |
| 9500.00 | 108.6 | 543.2 | 2.76 | 129.8 | 648.8 | 3.30 | 265.6 | 1327.8 | 6.75 |
| 10000.00 | 118.0 | 590.0 | 3.00 | 140.9 | 704.7 | 3.58 | 288.4 | 1442.2 | 7.33 |
| 10500.00 | 127.6 | 638.2 | 3.24 | 152.5 | 762.3 | 3.87 | 312.0 | 1560.1 | 7.93 |
| 11000.00 | 137.6 | 687.9 | 3.50 | 164.3 | 821.7 | 4.16 | 336.3 | 1681.6 | 8.54 |
| 11500.00 | 147.8 | 739.0 | 3.76 | 176.5 | 882.7 | 4.49 | 361.3 | 1806.5 | 9.18 |
| 12000.00 | 158.3 | 971.5 | 4.02 | 189.1 | 945.4 | 4.80 | 386.9 | 1934.7 | 9.83 |
| 12500.00 | 169.1 | 845.3 | 4.30 | 201.9 | 1009.6 | 5.13 | 413.2 | 2066.2 | 10.50 |
| 13000.00 | 180.1 | 900.4 | 4.58 | 215.1 | 1075.5 | 5.46 | 440.2 | 2201.0 | 11.18 |
| 13500.00 | 191.4 | 958.9 | 4.86 | 228.6 | 1142.9 | 5.81 | 467.8 | 2339.1 | 11.89 |
| 14000.00 | 202.9 | 1014.6 | 5.16 | 242.4 | 1211.9 | 6.16 | 496.0 | 2480.2 | 12.60 |
| 14500.00 | 214.7 | 1073.7 | 5.46 | 256.5 | 1282.4 | 6.52 | 524.9 | 2624.5 | 13.34 |
| 15000.00 | 226.6 | 1134.0 | 5.76 | 270.89 | 1354.44 | 6.88 | 554.4 | 2771.9 | 14.08 |

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Other embodiments are also within the scope of the following claims.

What is claimed is:

1. A radiation-curable hot melt ink composition comprising:
   a colorant;
   a polymerizable monomer; and
   a photoinitiating system comprising 0.5–1.5% by weight of an aromatic ketone photoinitiator, 2–10% by weight of an amine synergist, 3–8% by weight of a second photoinitiator different than the aromatic ketone photoinitiator and capable of undergoing alpha cleavage, and 0.5–1.5% by weight of a photosensitizer.

2. The radiation-curable hot melt ink composition of claim 1, wherein the polymerizable monomer is a multi-functional monomer.

3. The radiation-curable hot melt ink composition of claim 2, wherein the polymerizable monomer is an acrylate monomer.

4. The radiation-curable hot melt ink composition of claim 1, further comprising a diluent.

5. The radiation-curable hot melt ink composition of claim 4, wherein the diluent is a mono-functional or di-functional monomer.

6. The radiation-curable hot melt ink composition of claim 5, wherein the polymerizable monomer is a multi-functional monomer.

7. The radiation-curable hot melt ink composition of claim 6, wherein the polymerizable monomer is an acrylate monomer.

8. The radiation-curable hot melt ink composition of claim 1, wherein the radiation-curable hot melt ink composition has a viscosity ranging from about 1 centipoise to about 50 centipoise.

9. The radiation-curable hot melt ink composition of claim 1, further comprising a vehicle.

10. A radiation-curable liquid ink composition comprising:
    a colorant;
    a liquid polymerizable monomer; and
    a photoinitiating system comprising 2–4% by weight of an aromatic ketone photoinitiator, 5–10% by weight of an amine synergist, 5–10% by weight of a second photoinitiator different than the aromatic ketone photoinitiator and capable of undergoing alpha cleavage, and 2–4% by weight of a photosensitizer.

11. The radiation-curable liquid ink composition of claim 10, wherein the polymerizable monomer is a multi-functional monomer.

12. The radiation-curable liquid ink composition of claim 11, wherein the polymerizable monomer is an acrylate monomer.

13. The radiation-curable liquid ink composition of claim 10, further comprising a diluent.

14. The radiation-curable liquid ink composition of claim 13, wherein the diluent is a mono-functional or di-functional monomer.

15. The radiation-curable liquid ink composition of claim 14, wherein the polymerizable monomer is a multi-functional monomer.

16. The radiation-curable liquid ink composition of claim 15, wherein polymerizable monomer is an acrylate monomer.

17. The radiation-curable liquid ink composition of claim 10, wherein the radiation-curable liquid ink composition has a viscosity ranging from about 1 centipoise to about 50 centipoise.

18. A printing method, comprising:

printing a radiation-curable hot melt ink composition on a substrate to form an image, the composition comprising a colorant; a polymerizable monomer; and a photoinitiating system comprising 0.5–1.5% by weight of an aromatic ketone photoinitiator, 2–10% by weight of an amine synergist, 3–8% by weight of a second photoinitiator different than the aromatic ketone photoinitiator and capable of undergoing alpha cleavage, and 0.5–1.5% by weight of a photosensitizer; and irradiating the image.

19. A printing method, comprising the steps of:

printing a radiation-curable liquid ink composition on a substrate to form an image, the composition comprising a colorant; a polymerizable monomer; and a photoinitiating system comprising 2–4% by weight of an aromatic ketone photoinitiator, 5–10% by weight of an amine synergist, 5–10% by weight of a second photoinitiator different than the aromatic ketone photoinitiator and capable of undergoing alpha cleavage, and 2–4% by weight of a photosensitizer; and irradiating the image.

* * * * *